United States Patent [19]

Delp et al.

[11] Patent Number: 5,629,933
[45] Date of Patent: May 13, 1997

[54] METHOD AND SYSTEM FOR ENHANCED COMMUNICATION IN A MULTISESSION PACKET BASED COMMUNICATION SYSTEM

[75] Inventors: Gary S. Delp, Rochester; Albert A. Slane, Orocono, both of Minn.

[73] Assignee: International Business Machines Corporation, Armonk, N.Y.

[21] Appl. No.: 472,368

[22] Filed: Jun. 7, 1995

[51] Int. Cl.[6] .................... H04Q 11/04; H04J 3/24
[52] U.S. Cl. .............. 370/411; 370/412; 395/200.12
[58] Field of Search .................. 370/94.1, 94.3, 370/85.1, 85.9, 85.12, 85.14, 85.13, 85.15, 60, 61; 395/200.12

[56] References Cited

U.S. PATENT DOCUMENTS

| | | | |
|---|---|---|---|
| 4,941,089 | 7/1990 | Fischer | 364/200 |
| 4,995,080 | 2/1991 | Bestler et al. | 380/21 |
| 5,040,176 | 8/1991 | Barzilai et al. | 370/94.1 |
| 5,101,402 | 3/1992 | Chiu et al. | 370/17 |
| 5,260,942 | 11/1993 | Auerbach et al. | 370/94.1 |
| 5,325,361 | 6/1994 | Lederer et al. | 370/94.1 |
| 5,394,436 | 2/1995 | Meier et al. | 375/202 |
| 5,428,636 | 6/1995 | Meier | 375/202 |

*Primary Examiner*—Douglas W. Olms
*Assistant Examiner*—Matthew C. Phillips
*Attorney, Agent, or Firm*—Owen J. Gamon; Andrew J. Dillon

[57] ABSTRACT

The method and system for enhanced efficiency in a multi-session communication system which utilizes a series of data packets wherein each data packet includes an indication of the identity of a particular session to which that data packet belongs. Each received data packet is examined as that data packet is received to determine a session identity for that packet. An indication of the session identity is thereafter listed within a session queue only in response to an initial occurrence of that session identity. Each data packet for a listed session identity is then stored in a data packet queue in First-In First-Out (FIFO) order which is associated with the listed session identity wherein all packets for a session remain in order, even though the overall order of all packets may be enhanced. In this manner all data packets within a particular session may be efficiently accessed for processing or, alternatively, one or more data packets within each session may be accessed serially for processing in a round-robin fashion.

11 Claims, 5 Drawing Sheets

METHOD AND SYSTEM FOR ENHANCED COMMUNICATION IN A MULTISESSION PACKET BASED COMMUNICATION SYSTEM

BACKGROUND OF THE INVENTION

1. Technical Field

The present invention relates in general to an improved communication system and in particular to improved multisession packet based communication system. Still more particularly, the present invention relates to an improved method and system for processing data packets in a multisession packet based communication system.

2. Description of the Related Art

Modern data processing systems are often configured as Local Area Networks (LAN) having multiple nodes which are connected together for passing information throughout the network. Such networks typically comprise multiple nodes which pass information along interconnecting lines which may be twisted-pair wires, coaxial cables, fiber optic cables or the like. Nodes within such a network may be any of various types of devices hooked to the network such as personal computers, workstations, minicomputers, main frames or the like.

All nodes within such a network contain software which is responsible for organizing and coordinating the flow of information between nodes. One type of such software is dedicated to the mechanics of establishing a connection between nodes, of transmitting information between nodes, and of ending the connection when the information transmittal is complete. An extended series of information exchanges between two or more application software programs of this type is referred to as a "session." Thus, for example, during a "session" one node within a network may pass various pieces of information to a second node within the network by means of short packets which each contain part of a single message. Typically each such data packet contains a sequence number indicating the order in which the packets were sent. Because not all data packets within a single communication session follow the same route through a network, data packets may arrive at the receiving node in an order other than the order in which those packets were transmitted. Sequence numbers contained within the packets enable the software within the receiving node to reassemble the received data packet in the correct order.

This problem is exacerbated when a particular node within the data processing network deals with multiple sessions at the same time. In such a situation the received software typically deals with inbound packets on a first-in first-out FIFO basis with no regard to a determination of which session each data packet belongs to. Thereafter, a demultiplexing technique must be utilized to sort the received data packets into the correct order for each session. It should therefore be apparent that a need exists for a method for enhancing the efficiency of communication within a multisession packet based communication system.

SUMMARY OF THE INVENTION

It is therefore one object of the present invention to provide an improved communication system.

It is another object of the present invention to provide an improved multisession packet based communication system.

It is yet another object of the present invention to provide an improved method and system for processing data packets in a multisession packet based communication system.

The foregoing objects are achieved as is now described. The method and system of the present invention may be utilized to enhance the efficiency of a multisession communication system which utilizes a series of data packets wherein each data packet includes an indication of the identity of a particular session to which that data packet belongs. Each received data packet is examined as that data packet is received to determine a session identity for that packet. An indication of the session identity is thereafter listed within a session queue only in response to an initial occurrence of that session identity. Each data packet for a listed session identity is then stored in a data packet queue in First-In First-Out (FIFO) order which is associated with the listed session identity wherein all packets for a session remain in order, even though the overall order of all packets may be enhanced. In this manner all data packets within a particular session may be efficiently accessed for processing or, alternatively, one or more data packets within each session may be accessed serially for processing in a round-robin fashion.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
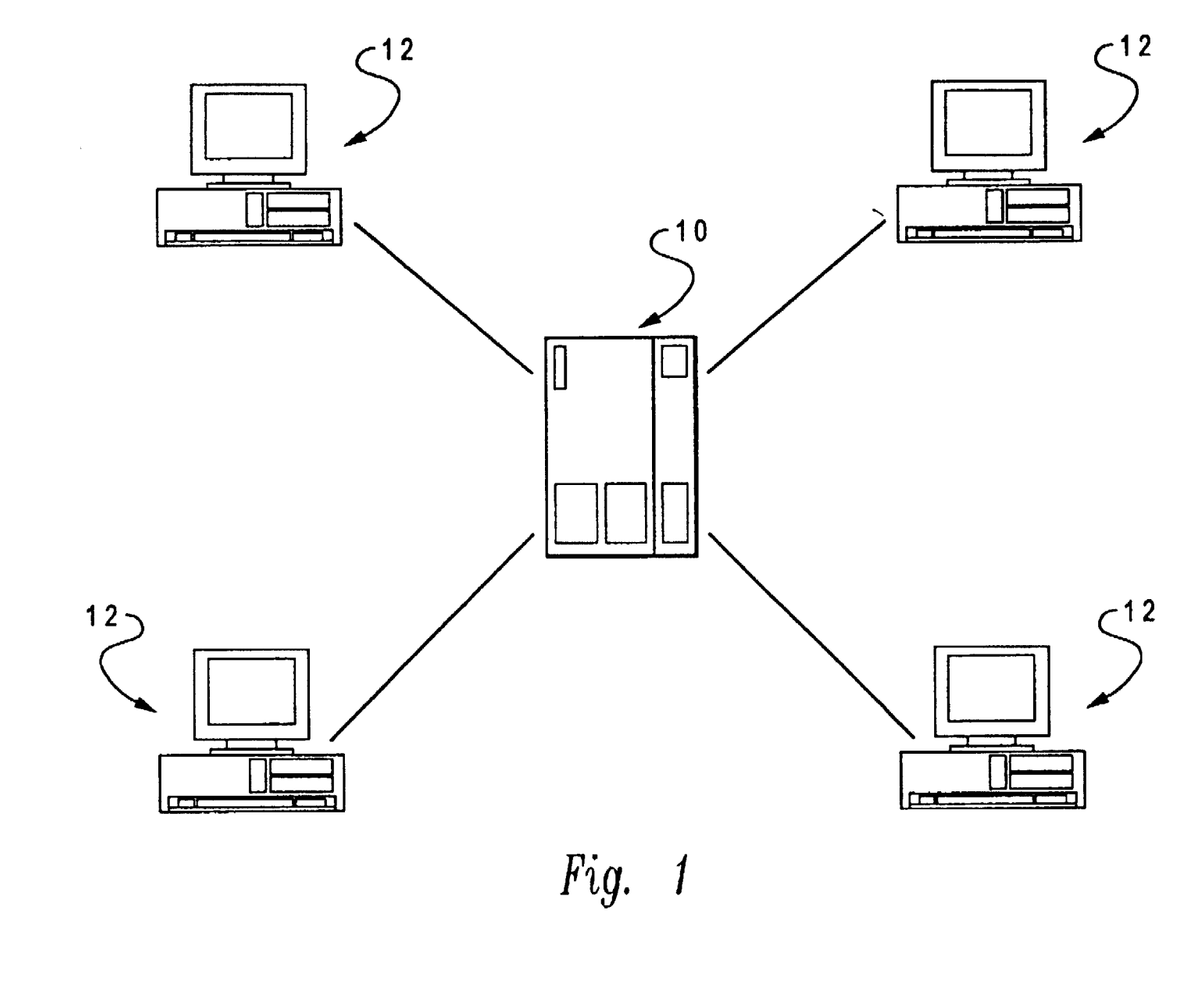
FIG. 1 is a pictorial representation of a data processing system which may be utilized to implement the method and system of the present invention.

With reference now to the figures and in particular with reference to FIG. 1, there is depicted a pictorial representation of a data processing system which may be utilized to implement the method and system of the present invention. As depicted within FIG. 1 the data processing system includes a server computer 10 which is coupled to multiple client computers 12. Server computer 10 may be implemented utilizing any suitable data processing system such as the Application System AS/400 manufactured by International Business Machines Corporation of Armonk, N.Y. Client personal computers 12 may be implemented utilizing any suitable terminal or personal computer. As illustrated in FIG. 1, each client computer 12 is coupled to server computer 10 and thus, many communication sessions may be concurrently implemented at server computer 10. Those skilled in the art will appreciate that the present invention will also find application within an end node or router which connects two networks or, in any other node in which multiple communication sessions are concurrently utilized.

Figure 2:
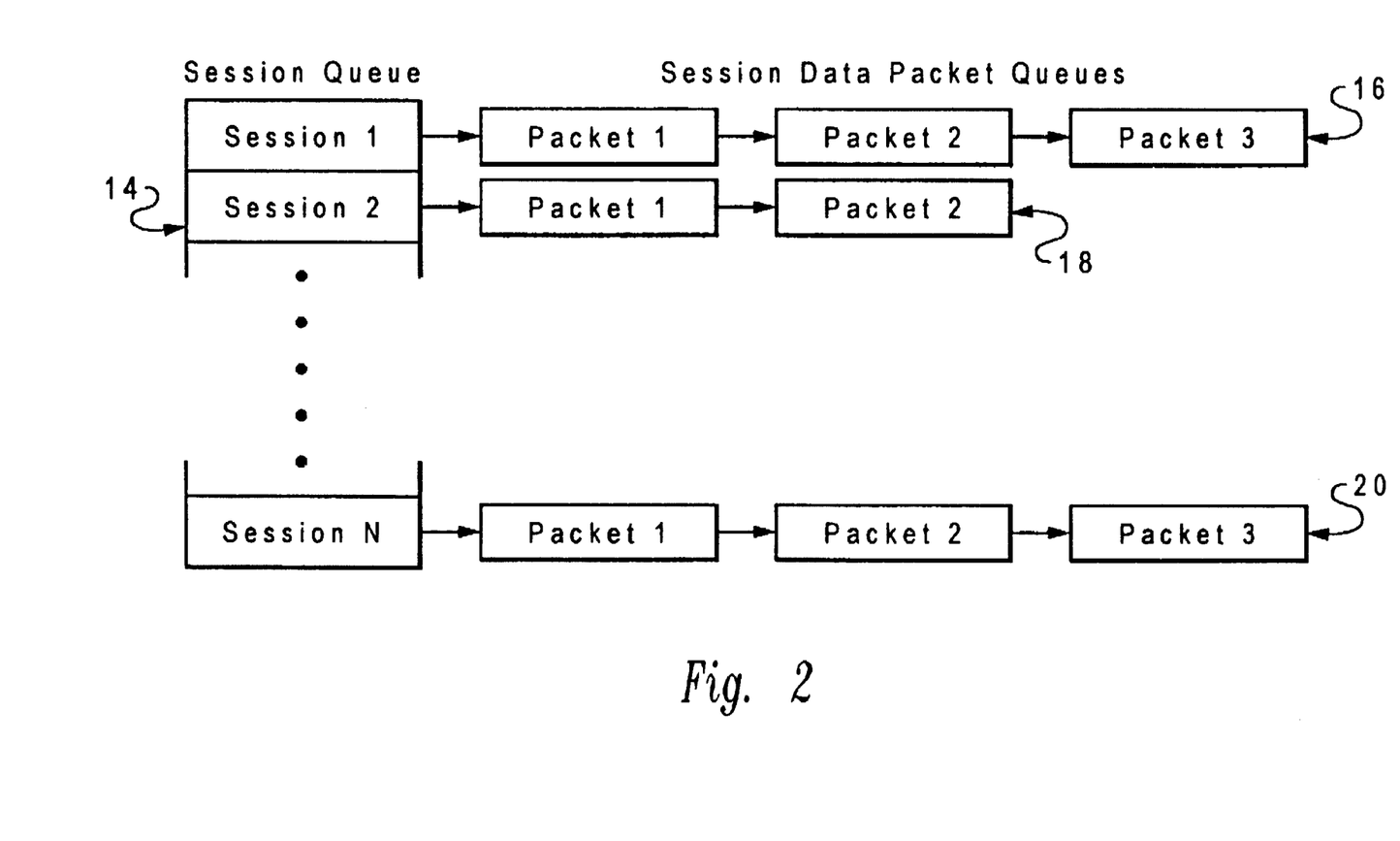
FIG. 2 is a pictorial representation of one embodiment of the novel receive queue which may be utilized to implement the method and system of the present invention.

Referring now to FIG. 2 is a pictorial representation of one embodiment of the novel receive queue which may be utilized to implement the method and system of the present invention. The receive queue depicted within FIG. 2 is preferably implemented within server 10 and includes a session queue 14 which includes an indication of the identity of each session which is detected at server unit 10 in response to each initial occurrence of a session identity. Thereafter, each data packet within that session is stored within an associated session data packet queue 16, 18 or 20. Thus, the receipt of packet 1 within session 1 will cause an entry within session queue 14 of the identity of session 1 and the storage of packet 1 within an associated session data packet queue 16. Thereafter, each time a data packet is received which is associated with session 1, which may be determined by examining the header data associated with each data packet, that data packet is stored within session data packet queue 16. Similarly, upon receipt of the first packet within session 2 is placed within session queue 14 and each subsequent data packet received after the identification of session 2 which is associated with session 2 will be stored within session data packet queue 18. In this manner, with a minimal administrative overhead the data packets associated with each of the multiple sessions which are occurring at server 10 may be simply and efficiently stored for future processing utilizing a plurality of session data packet queues and a single session queue which stores the identity of each identified session identity which is current within server 10.

Figure 3:
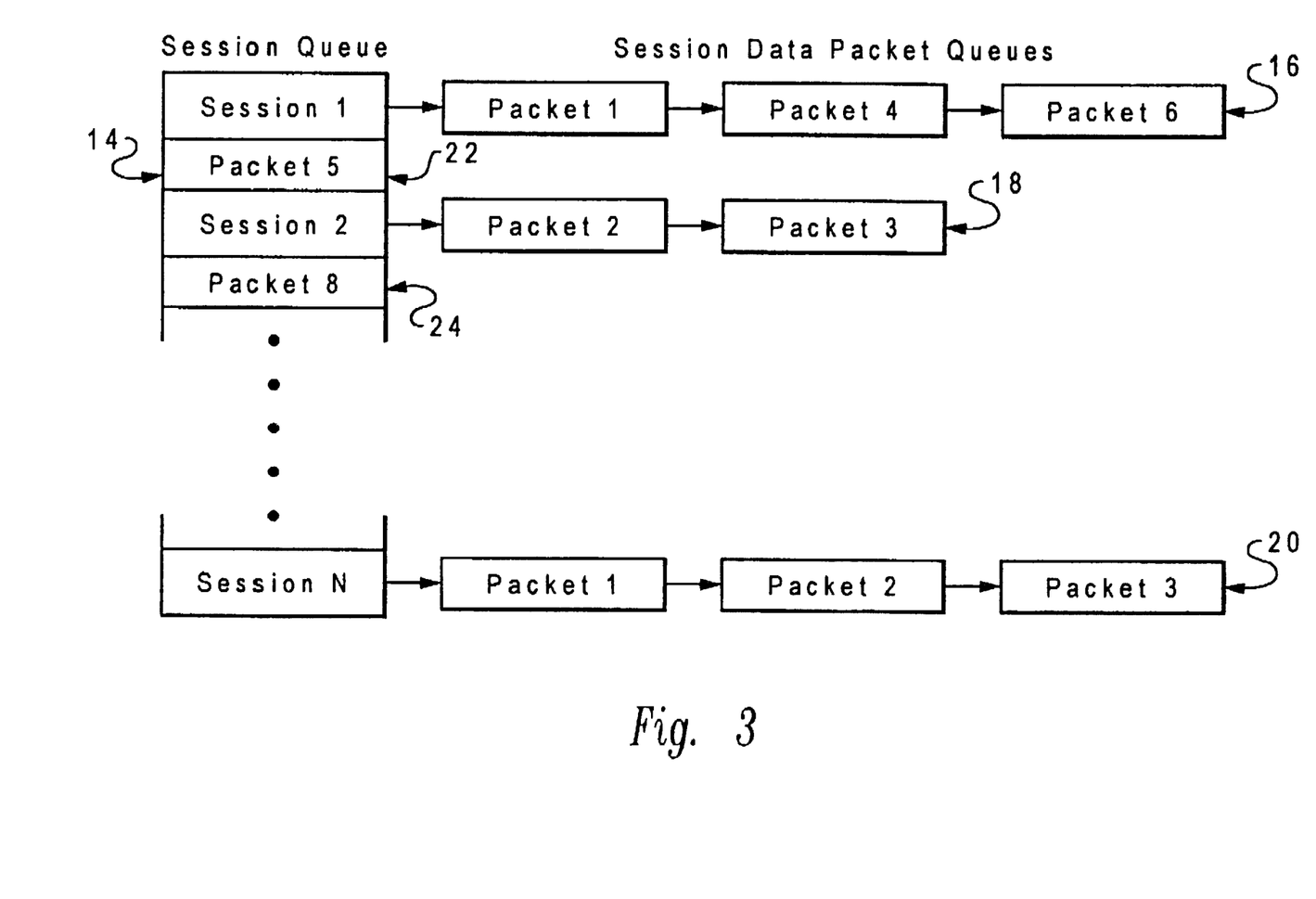
FIG. 3 is a pictorial representation of a second embodiment of the novel receive queue which may be utilized to implement the method and system of the present invention.

With reference now to FIG. 3 there is a pictorial representation of a second embodiment of the novel receive queue which may be implemented within server 10 of FIG. 1. In accordance with this embodiment the session queue 14 is also utilized to store various packets which have been identified as belonging to a particular session which are to be processed within session queue 14.

Thus, upon receipt of packet 1 and an indication within that packet that it is associated with session 1 the identity of session 1 is placed within session queue 14. Packet 1 is then placed within the associated session data packet queue 16. Thereafter, the receipt of packet 2, indicating an association with session 2 will result in the placement of an indication of the identity of session 2 within session queue 14 and the storage of packet 2 within associated session data packet queue 18.

As illustrated within FIG. 3, packets 5 and 8, as depicted at reference numerals 22 and 24, are associated with a session which has been exempted from the session queue and session data packet queue method depicted within this figure. Thus, each packet received which is associated with a session which has been indicated as exempt from this process will be stored within session queue 14 in the manner depicted within FIG. 3.

In this embodiment of the present invention software within the receive processing unit accesses the receive queue and looks at the first entry within session queue 14. If that first entry is a packet then the data packet event is removed from that queue and the data packet is transferred to the receive software. However, in the event the first object within session queue 14 is a session event then the session is not removed from the session queue; however, the data packets stored within the associated session data packet queue for that session are removed and processed. After the entire data packet lists within the associated session data packet queue has been removed the session identity is then removed from session queue 14. This operation is preferably done in an atomic manner such that a new data packet is not added to the associated session data packet queue while the session identity is being removed from session queue 14.

Figures 4, 5:
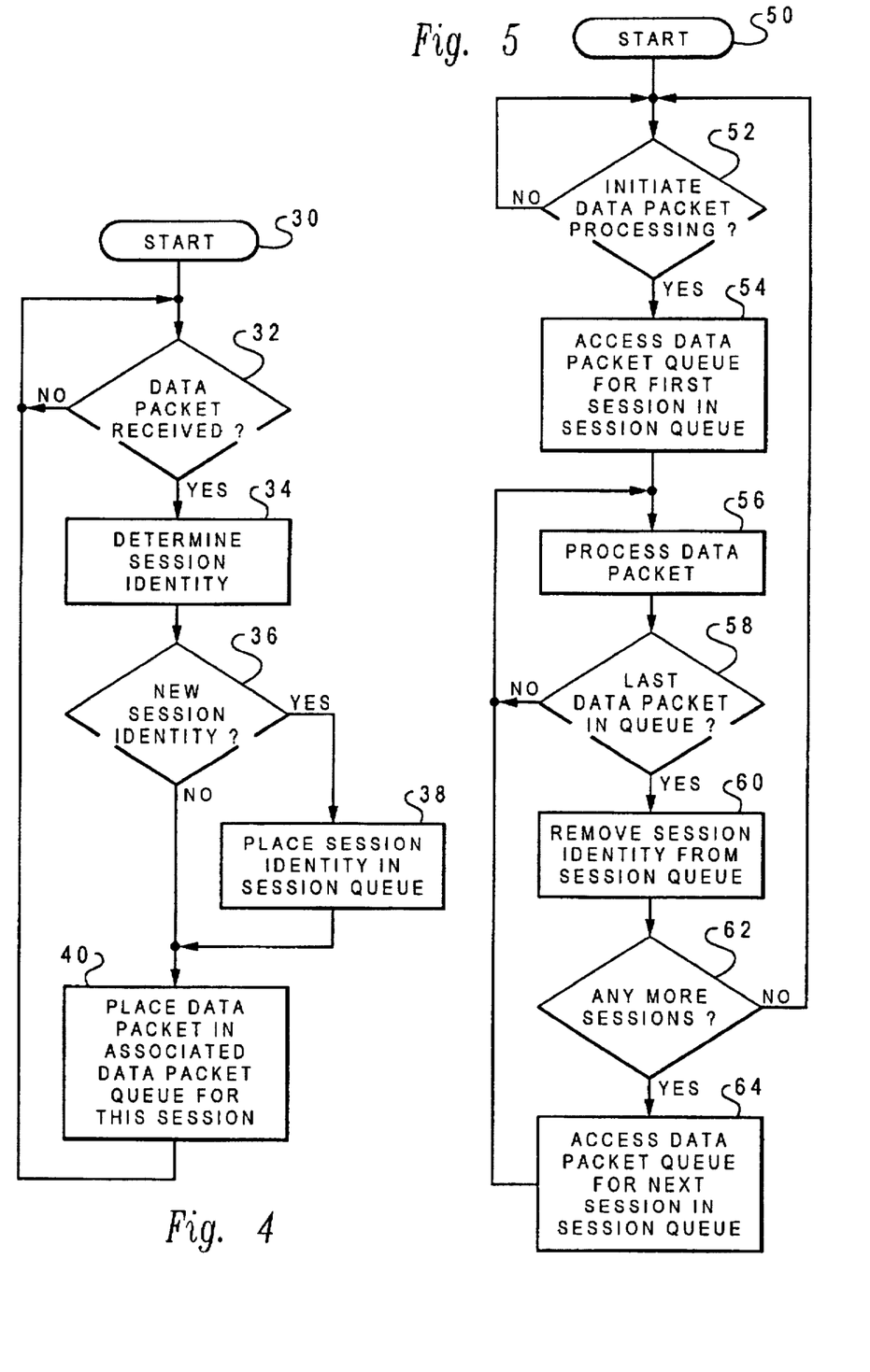
FIG. 4 is a high level logic flowchart of a process which may be implemented within the data processing system of FIG. 1 to implement the receipt of multisession data packets in accordance with the method and system of the present invention.
FIG. 5 is a high level logic flowchart of a process which may be implemented within the data processing system of FIG. 1 to implement the processing of multisession data packets in accordance with a first embodiment of the method and system of the present invention.

Referring now to FIG. 4 there is depicted a high level logic flowchart of a process which may be implemented within the data processing system of FIG. 1 to implement the receipt of multisession data packets in accordance with the method and system of the present invention. As illustrated, this process begins at block 30 and thereafter passes to block 32. Block 32 illustrates a determination of whether or not a data packet has been received and if not, the process merely iterates until such time as a data packet has been received.

Still referring to block 32, in the event a data packet has been received the process passes to block 34. Block 34 illustrates a determination of the session identity for that data packet. Thereafter, the process passes to block 36. Block 36 illustrates a determination of whether or not the determined session identity is a new session identity. That is, a session identity not previously identified within this period of time. If so, the process passes to block 38 which depicts the placing of the session identity for the new session identity into the session queue. Thereafter, or in the event the session identity determined is not a new session identity, the process passes to block 40. Block 40 illustrates the placing of the data packet in the associated data packet queue for the identified session and the process then returns to block 32 in an iterative fashion.

With reference now to FIG. 5 there is depicted a high level logic flowchart of a process which may be implemented within the data processing system of FIG. 1 to implement the processing of multisession data packets in accordance with a first embodiment of the method and system of the present invention. As illustrated, this process begins at block 50 and thereafter passes to block 52. Block 52 illustrates a determination of whether or not the initiation of data packet processing has begun. If not, the process merely iterates until such time as data packet processing has been initiated.

Still referring to block 52, in the event data packet processing has been initiated, the process passes to block 54. Block 54 illustrates the accessing of the data packet queue for the first session within the session queue. Thereafter, the process passes to block 56.

Block 56 depicts the processing of the first data packet stored within an associated session data packet queue for the first session within the session queue. Thereafter, the process passes to block 58.

Block 58 illustrates a determination of whether or not the processed data packet is the last packet within the associated session data packet queue and if not, the process returns to block 56 in an iterative fashion to process a subsequent data packet. Still referring to block 58 in the event the data packet processed is the last packet within an associated session data packet queue the process passes to block 60. Block 60 illustrates the removing of the session identity for this session from the session queue. The process then passes to block 62. Block 62 illustrates a determination of whether or not any remaining sessions are present within the session queue and if not, the process returns to block 52 in an iterative fashion to await the initiation of data packet processing.

Still referring to block 62, in the event additional sessions are present within the session queue the process passes to block 64 which depicts the accessing of the data packet queue for the next session within the session queue and the process then returns to block 56, in an iterative fashion, to begin the processing of data packets in the associated session data packet queue for the now current session.

Figure 6:
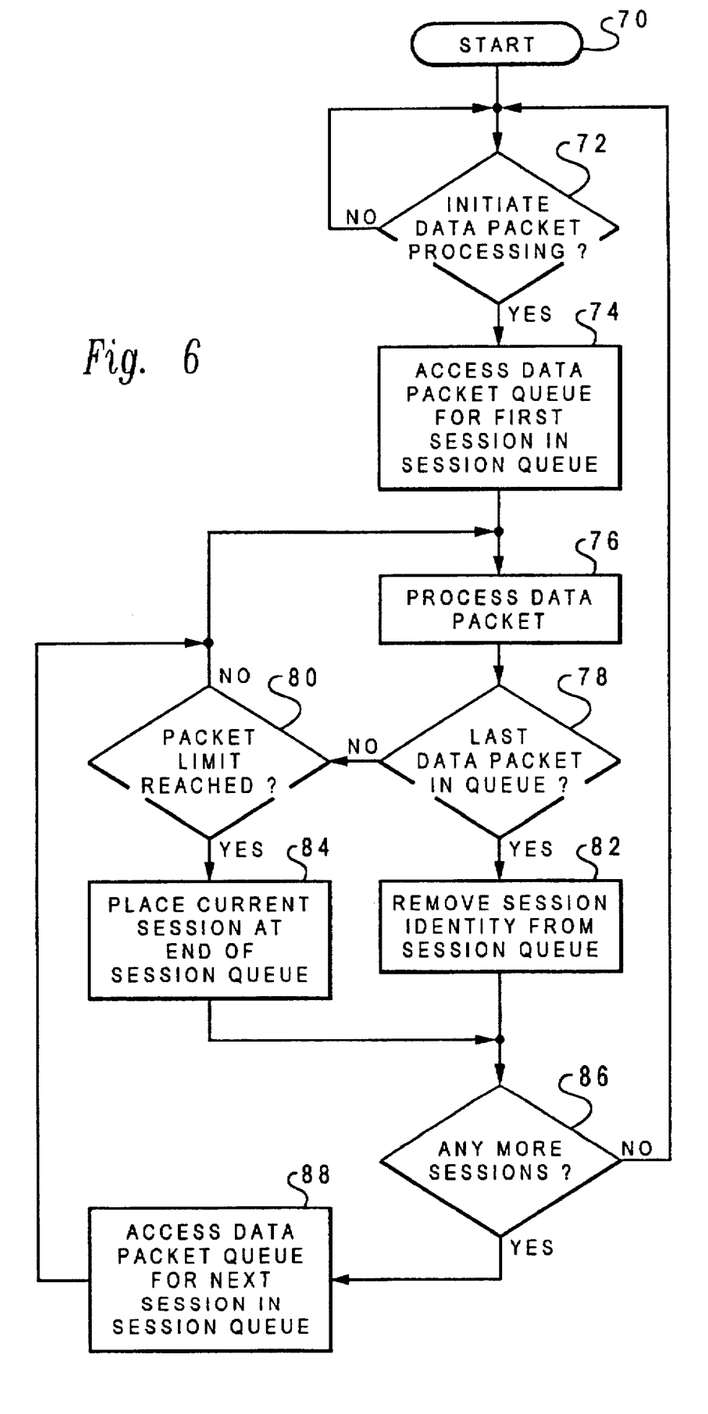
FIG. 6 is a high level logic flowchart of a process which may be implemented within the data processing system of FIG. 1 to implement processing of multisession data packets in accordance with a second embodiment of the method and system of the present invention.

Finally, with reference to FIG. 6 there is depicted a high level logic flowchart of a process which may be implemented within the data processing system of FIG. 1 to implement processing of multisession data packets in accordance with a second embodiment of the method and system of the present invention. As illustrated, this process begins at block 70 and thereafter passes to block 72. As described above, block 72 depicts a determination of whether or not data packet processing has been initiated and if not, the process merely returns in an iterative fashion to await the initiation of data packet processing. However, once the initiation of data packet processing has been detected the process passes to block 74.

Block 74 illustrates the accessing of the associated session data packet queue for the first session listed within the session queue. Block 76 then depicts the processing of the first data packet within that session data packet queue. The process then passes to block 78 which illustrates a determination of whether or not the data packet processed is the last data packet within the queue and if not, the process passes to block 80. Block 80 illustrates a determination of whether or not the packet limit has been reached for this session. Those skilled in the art will appreciate upon reference to the foregoing that large communication sessions having multiple packets may substantially eliminate communication present within other data sessions and thus, a so-called "round-robin" processing technique may be preferable. In such a technique, one or more data packets within a particular session are processed until a limit number of data packets has been reached. Thereafter, data packets associated with a second session will be processed and the remaining data packets within the first session will be accessed subsequently in a round-robin fashion.

Still referring to block 80 in the event the packet limit for the depict process is not reached the process returns to block 76 in an iterative fashion to process a subsequent data packet within the session data packet associated with this particular session. Referring back to block 78, in the event the data packet just processed is the last data packet within a queue the process passes to block 82. Block 82 illustrates the removal of the session identity for this session from the session queue and the process then passes to block 86. Alternatively, referring to block 80, in the event the packet limit for the implemented process has been reached for a particular session this leg of the process also passes to block 84. Block 84 illustrates the reordering of the session queue by placing the current session identity at the end of the session queue.

Referring now to block 86, in the event the last data packet within a queue has been processed and the session identity for that session removed from the session queue or, alternatively, the packet limit has been reached for a particular session and the session queue has been reordered, block 86 illustrates a determination of whether or not any remaining sessions are present within the session queue. If not, the process returns in an iterative fashion to initiate data packet processing again. However, in the event additional sessions are present within the session queue, as determined at block 86, the process passes to block 88 which illustrates the accessing of a data packet queue from the associated session data packet queue for the next session within the session queue and the process then returns to block 76 in an iterative fashion to continue the processing of data packets.

Upon reference to the foregoing those skilled in the art will appreciate that the applicant herein have provided a method and system whereby a plurality of data packets associated with multiple sessions in a communication system may be quickly and efficiently processed during receipt of those data packets in a manner which renders subsequent demultiplexing of those packets either unnecessary or minimally complex.

While the invention has been particularly shown and described with reference to a preferred embodiment, it will be understood by those skilled in the art that various changes in form and detail may be made therein without departing from the spirit and scope of the invention.

We claim:

1. A method for enhanced communication in a multisession packet based communication system wherein said communication system utilizes a series of data packets, each data packet including an indication of the identity of a particular session which includes that data packet, said method comprising the steps of:

examining each data packet as that data packet is received within said series to determine a session identity associated therewith;

enqueing within a session queue each determined session identity only in response to an initial occurrence of each session identity;

enqueing within said session queue each data packet associated with a predetermined session identity;

providing a data packet queue in association with each enqueued session identity; and enqueing within an associated data packet queue each received data packet included within a particular session, other than said predetermined session, wherein selected data packets may be efficiently processed from a data packet queue and from said session queue.

2. The method according to claim 1, further including the step of selectively processing only those data packets enqueued within a single one of said associated data packet queues.

3. The method according to claim 1, further including the step of serially processing at least one data packet queue from every data packet queue in a round-robin fashion.

4. The method according to claim 3, further including the step of removing an enqueued session identity from said session queue in response to a processing of all data packets within said associated data packet queue.

5. The method according to claim 1, further including the step of removing an enqueued session identity from said session queue in response to a processing of all data packets within said associated data packet queue.

6. A system for enhanced communication in a multisession packet based communication system wherein said communication system utilizes a series of data packets, each data packet including an indication of the identity of a particular session which includes that data packet, said method comprising the steps of:

means for examining each data packet as that data packet is received within said series to determine a session identity associated therewith;

means for enqueing within a session queue each determined session identity only in response to an initial occurrence of each session identity;

means for enqueing within said session queue each data packet associated with a predetermined session identify;

a plurality of data packet queues, each data packet queue associated with a particular enqueued session identity; and means for enqueing within an associated data packet queue each received data packet included within a particular session, other than said predetermined session, wherein selected data packets may be efficiently processed from a data packet queue and said session queue.

7. The system according to claim 6, further including means for selectively processing only those data packets enqueued within a single one of said associated data packet queues.

8. The system according to claim 7, further including means for removing an enqueued session identity from said session queue in response to a processing of all data packets within said associated data packet queue.

9. The system according to claim 6, further including means for serially processing at least one data packet queue from every data packet queue in a round-robin fashion.

10. The system according to claim 9, further including removing an enqueued session identity from said session queue in response to a processing of all data packets within said associated data packet queue.

11. A data processing program product for providing enhanced communication in a multisession packet based communication system wherein said communication system utilizes a series of data packets, each data packet including an indication of the identity of a particular session which includes that data packet, said data processing program product embodied within a storage media adapted to be coupled to a data processing system, said data processing program product comprising:

instruction means for examining each data packet as that data packet is received within said series to determine a session identity associated therewith;

instruction means for enqueing within a session queue each determined session identity only in response to an initial occurrence of each session identity;

instruction means for enqueing within said session queue each data packet associated with a predetermined session identity;

instruction means for providing a data packet queue in association with each enqueued session identity; and instruction means for enqueing within an associated data packet queue each received data packet included within a particular session, other than said predetermined session, wherein selected data packets may be efficiently processed from a data packet and said session queue.

* * * * *

UNITED STATES PATENT AND TRADEMARK OFFICE
CERTIFICATE OF CORRECTION

PATENT NO. : 5,629,933
DATED : May 13, 1997
INVENTOR(S) : Delp et al.

It is certified that error appears in the above-indentified patent and that said Letters Patent is hereby corrected as shown below:

Column 6, line 49: delete "queue"

Column 7, line 25: delete "queue"

Signed and Sealed this

Nineteenth Day of August, 1997

Attest:

BRUCE LEHMAN

*Attesting Officer*  *Commissioner of Patents and Trademarks*